United States Patent
Nii et al.

(10) Patent No.: US 9,130,659 B2
(45) Date of Patent: Sep. 8, 2015

(54) COMMUNICATION DEVICE AND COMMUNICATION SYSTEM

(71) Applicants: SUMITOMO ELECTRIC INDUSTRIES, LTD., Osaka-shi, Osaka (JP); SUMITOMO WIRING SYSTEMS, LTD., Mie (JP); AUTONETWORKS TECHNOLOGIES, LTD., Mie (JP)

(72) Inventors: Kazuhiko Nii, Osaka (JP); Takeshi Hagihara, Osaka (JP); Ryou Okada, Osaka (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 0 days.

(21) Appl. No.: 14/390,725

(22) PCT Filed: Feb. 12, 2013

(86) PCT No.: PCT/JP2013/053223
§ 371 (c)(1),
(2) Date: Oct. 3, 2014

(87) PCT Pub. No.: WO2013/150820
PCT Pub. Date: Oct. 10, 2013

(65) Prior Publication Data
US 2015/0117556 A1    Apr. 30, 2015

(30) Foreign Application Priority Data
Apr. 4, 2012   (JP) ................. 2012-085805

(51) Int. Cl.
*H04B 3/00* (2006.01)
*H04B 3/56* (2006.01)

(52) U.S. Cl.
CPC ...................... *H04B 3/56* (2013.01)

(58) Field of Classification Search
CPC ........................................... H04B 3/56
USPC ........................................... 375/257
See application file for complete search history.

(56) References Cited

U.S. PATENT DOCUMENTS

| 4,675,648 A | * | 6/1987 | Roth et al. | .......... 307/104 |
| 5,485,040 A | * | 1/1996 | Sutterlin | ............ 307/3 |

(Continued)

FOREIGN PATENT DOCUMENTS

| JP | 07-500463 A | 1/1995 |
| JP | 11-154842 A | 6/1999 |

(Continued)

OTHER PUBLICATIONS

SAE International: Surface Vehicle Recommended Practice, (R) "SAE Electric Vehicle and Plug in Hybrid Electric Vehicle Conductive Charge Coupler", SAE J1772, Jan. 2010, 51 pages.

(Continued)

*Primary Examiner* — Juan A Torres
(74) *Attorney, Agent, or Firm* — McDermott Will & Emery LLP

(57) ABSTRACT

Provided are a communication device and a communication system which are used for communication such as power line communication or inband communication in which a communication signal is superposed on lines contained in a charging cable, when a vehicle including a power storage device is charged from a power supply device, and which suppress a noise component such as harmonic distortion caused by occurrence of ringing without greatly affecting the communication signal, when transmitting the communication signal by switching from an idle state to an operating state. A transmission circuit included in a communication device of a vehicle includes line drivers, and the line drivers transmit a communication signal via two signal lines. In the two signal lines connected to the transmission circuit, inductance elements, resistance elements, and capacitance elements are interposed in series, respectively.

4 Claims, 5 Drawing Sheets

(56) References Cited

U.S. PATENT DOCUMENTS

| | | | |
|---|---|---|---|
| 5,500,509 A * | 3/1996 | Vogt | 219/501 |
| 5,734,658 A | 3/1998 | Rall et al. | |
| 2003/0052771 A1 | 3/2003 | Enders et al. | |
| 2006/0038445 A1 * | 2/2006 | Yanagida et al. | 307/1 |
| 2006/0170285 A1 | 8/2006 | Morimitsu et al. | |
| 2007/0201542 A1 | 8/2007 | Hertel et al. | |
| 2010/0174667 A1 * | 7/2010 | Vitale et al. | 705/412 |
| 2010/0312188 A1 * | 12/2010 | Robertson et al. | 604/156 |
| 2011/0172839 A1 | 7/2011 | Brown et al. | |
| 2011/0207358 A1 | 8/2011 | Ichikawa et al. | |
| 2013/0063255 A1 * | 3/2013 | Washiro | 340/12.32 |

FOREIGN PATENT DOCUMENTS

| | | |
|---|---|---|
| JP | 2003-209497 A | 7/2003 |
| JP | 2007-013812 A | 1/2007 |
| JP | 2009-253498 A | 10/2009 |
| JP | 2010-123284 A | 6/2010 |

OTHER PUBLICATIONS

International Search Report issued in PCT/JP2013/053223, dated Mar. 19, 2013, with English translation.

* cited by examiner

A

B

COMMUNICATION DEVICE AND COMMUNICATION SYSTEM

RELATED APPLICATIONS

This application is the U.S. National Phase under 35 U.S.C. §371 of International Application No. PCT/JP2013/053223, filed on Feb. 12, 2013, which in turn claims the benefit of Japanese Application No. 2012-085805, filed on Apr. 4, 2012, the disclosures of which Applications are incorporated by reference herein.

TECHNICAL FIELD

The present invention relates to: a communication device which performs communication via signal lines connected to power supply lines, or signal lines connected to a control line for transmitting a control signal used for power supply control and to a reference potential line connected to a reference potential; and a communication system including the communication device.

BACKGROUND ART

In recent years, electric vehicles and hybrid vehicles are beginning to prevail, which include devices such as motors and batteries, and travel by driving the motors with power stored in the batteries. The electric vehicles charge their batteries with power supplied from external power supply devices. As for the hybrid vehicles, plug-in hybrid vehicles have been practically used, which allow their batteries to be charged by external power supply devices. The external power supply devices are power supply devices installed in ordinary houses or facilities such as commercial power supply stations. When a power supply device supplies power to a vehicle, a plug at an end of a charging cable connected to the power supply device is connected to a power supply port which is provided in the vehicle as a power receiving connector. Then, power is supplied from the power supply device to the vehicle via a power supply line contained in the charging cable, and thereby the battery is charged.

Not only the power supply line but also other lines such as a grounding line, a control line, and the like are contained in the charging cable. The control line is a line used for transmission of a control signal such as a control pilot signal or the like used for control of power supply to the power storage device. By transmitting and receiving the control signal between the power supply device and the vehicle via the control line, various states are detected such as the connection state of the charging cable, whether charging is possible or not, the state of charging, and the like, and charging control is performed according to the detected states.

Further, for practical use of vehicles that need external power supply, such as electric vehicles and hybrid vehicles, a communication function is required which allows a vehicle and a power supply device to transmit and receive information for charging control, and communication information for management of the amount of charge or accounting, or the like.

Thus, standardization of communication such as power line communication has been progressed in which a communication signal is superposed on a power supply line as a medium to allow communication between a vehicle and a power supply device. As for the method of transmitting/receiving a communication signal, in addition to the power line communication, standardization of communication such as inband communication has also been progressed in which a communication signal is superposed on a control signal using a control line as a medium so as to be transmitted and received between a vehicle and a power supply device (refer to Non-Patent Literature 1, for example).

In the communications such as the power line communication and the inband communication, a superposition/separation unit using a transformer having a first coil and a second coil is connected to lines such as a power supply line, a grounding line, a control line, and the like. The superposition/separation unit is connected to a communication device via a signal line, and superposes and separates, on and from the lines, a communication signal input to and output from the communication device, thereby allowing a vehicle and a power supply device to perform communication.

FIG. 5 is a circuit diagram showing a configuration regarding a transmission circuit included in a communication device in a conventional communication system. In FIG. 5, reference numeral 1000 denotes the transmission circuit included in the communication device. The transmission circuit 1000 includes two line drivers 1001 and 1001 each outputting a communication signal. The line drivers 1001 and 1001 are connected to a superposition/separation unit 1003 by two signal lines 1002 and 1002 that transmit the communication signals. In addition, resistance elements 1004 and 1004 and capacitance elements 1005 and 1005 are interposed in the two signal lines 1002 and 1002, respectively. The resistance elements 1004 and 1004 are current limiting resistors having a peak current suppressing function. The capacitance elements 1005 and 1005 are capacitors having a DC component blocking function. A high-level or low-level driver enable signal (Driver Enable) is input to the line drivers 1001 and 1001 from a not-illustrated control circuit. Each of the line drivers 1001 and 1001 is designed to operate only when transmitting a communication signal, and is switched from an idle state where it cannot transmit the communication signal to an operating state where it can transmit the communication signal when the driver enable signal is switched from a low level to a high level. In addition, when the driver enable signal is switched from the high level to the low level, each of the line drivers 1001 and 1001 is switched from the operating state to the idle state.

CITATION LIST

Non Patent Literature

NON PATENT LITERATURE 1: "SURFACE VEHICLE RECOMMENDED PRACTICE", J1772 January 2010, Society of Automotive Engineers, Inc., October, 1996 (revised in January, 2010)

SUMMARY OF INVENTION

Technical Problem

However, when, with the driver enable signal being input, the line drivers 1001 and 1001 are each switched from the idle state to the operating state where it can transmit the communication signal, current is rapidly injected to the signal lines 1002 and 1002 at low impedance. In this case, ringing may occur in a transmission output waveform depending on the resistance values of the resistance elements 1004 and 1004. Such ringing may cause a problem that harmonic distortion is superposed on the communication signal to be output. A similar problem will occur also when the line drivers 1001 and 1001 are switched from the operating state to the idle state.

Then, a noise component such as the harmonic distortion based on occurrence of the ringing is output to the outside of the transmission circuit 1000 and to the outside of the communication device, thereby leading to a problem that unit EMC is degraded.

It is possible to suppress occurrence of ringing by increasing the resistance values of the resistance elements 1004 and 1004. In this case, however, transmission output impedance is uniformly increased, thereby leading to a problem that the communication signal is attenuated.

The present invention has been made in view of the above situation. An object of the present invention is to provide a communication device and a communication system which can effectively suppress occurrence of undesired ringing without greatly affecting a communication signal, by interposing inductance elements in signal lines.

Solution to Problem

A communication device according to the present invention includes a signal line connected to a power supply line used for power supply, and a transmission circuit configured to transmit a communication signal via the signal line. When transmitting the communication signal, the transmission circuit is switched from a state where it cannot transmit the communication signal to a state where it can transmit the communication signal. The communication device includes an inductance element interposed in the signal line.

A communication device according to the present invention includes two signal lines respectively connected to a control line for transmitting a control signal used for power supply control and to a reference potential line connected to a reference potential, and a transmission circuit configured to transmit the communication signal via the signal lines. When transmitting the communication signal, the transmission circuit is switched from a state where it cannot transmit the communication signal to a state where it can transmit the communication signal. The communication device includes an inductance element interposed in the signal lines.

The communication device according to the present invention further includes a resistance element interposed in the signal line(s) in series with the inductance element. In a communication band used for the communication signal, an absolute value of impedance caused by the inductance element and the resistance element is smaller than an absolute value of impedance of a circuit as a destination of the communication signal.

A communication system according to the present invention is a communication system in which a power supply device and a vehicle which has a communication function and includes a power storage device supplied with power from the power supply device, are connected to each other via a power supply line used for power supply, and a communication signal is transmitted and received using the power supply line as a medium. One of the power supply device and the vehicle includes: a signal line connected to the power supply line; a transmission circuit configured to transmit the communication signal via the signal line, the transmission circuit, when transmitting the communication signal, being switched from a state where it cannot transmit the communication signal to a state where it can transmit the communication signal; and an inductance element interposed in the signal line. The other one of the power supply device and the vehicle includes a reception circuit configured to receive the communication signal transmitted from the transmission circuit.

A communication system according to the present invention is a communication system in which a power supply device and a vehicle which has a communication function and includes a power storage device supplied with power from the power supply device, are connected to each other via a power supply line used for power supply, a control line for transmitting a control signal used for power supply control for the power storage device, and a reference potential line connected to a reference potential, and a communication signal different from the control signal is transmitted and received using the control line and the reference potential line as media. One of the power supply device and the vehicle includes: two signal lines respectively connected to the control line and the reference potential line; a transmission circuit configured to transmit the communication signal via the signal lines, the transmission circuit, when transmitting the communication signal, being switched from a state where it cannot transmit the communication signal to a state where it can transmit the communication signal; and an inductance element interposed in the signal lines. The other one of the power supply device and the vehicle includes a reception circuit configured to receive the communication signal transmitted from the transmission circuit.

The communication system according to the present invention further includes a resistance element interposed in the signal line(s), in series with the inductance element. In a communication band used for the communication signal, an absolute value of impedance caused by the inductance element and the resistance element is smaller than an absolute value of impedance of the reception circuit.

According to the present invention, a circuit configuration is realized in which impedance is increased in proportion to frequency by the inductance element interposed in the signal line(s).

Advantageous Effects of Invention

In the communication device and the communication system according to the present invention, a circuit configuration is realized in which impedance is increased in proportion to frequency by an inductance element interposed in a signal line. Thereby, advantageous effects are achieved such as that superposition of harmonic distortion on a communication signal due to occurrence of undesired ringing can be suppressed without greatly affecting the communication signal.

DESCRIPTION OF EMBODIMENTS

Hereinafter, the present invention will be described in detail with reference to the drawings showing embodiments thereof.

Embodiment 1

Figure 1:
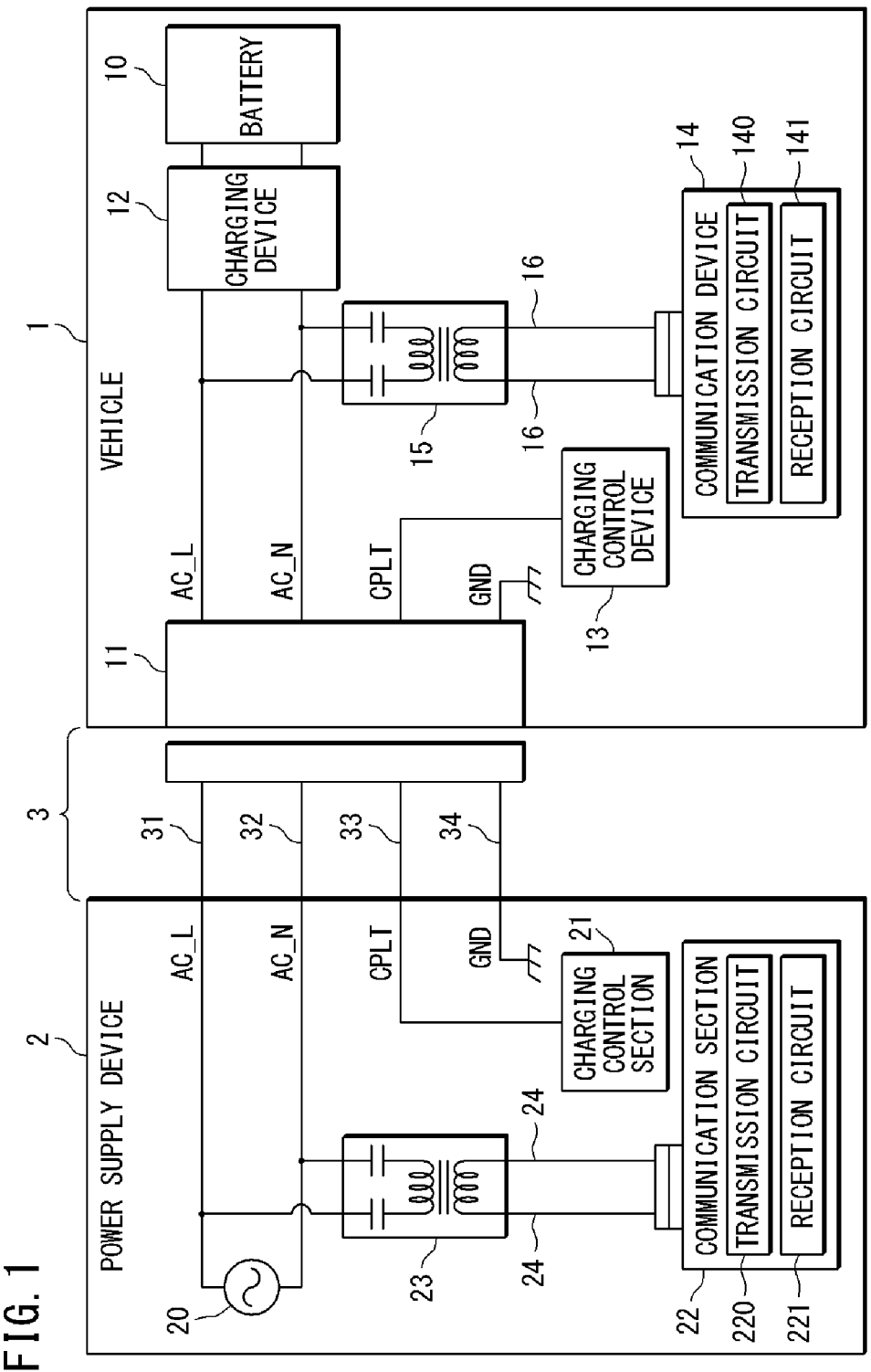
FIG. 1 is a diagram showing an exemplary configuration of a communication system according to Embodiment 1 of the present invention.

FIG. 1 is a diagram showing an exemplary configuration of a communication system according to Embodiment 1 of the present invention. FIG. 1 shows an example in which the present invention is applied to a case in which a battery (power storage device) 10 included in a vehicle 1 such as an electric vehicle, a plug-in hybrid vehicle, or the like is supplied with power from a power supply device 2 such as a charging station.

The vehicle 1 and the power supply device 2 can be connected to each other by a charging cable 3. The charging cable 3 contains two power supply lines 31 and 32 used for power supply, a control line 33 for transmitting a control signal such as a control pilot signal (CPLT) used for charging control, and a reference potential line 34 connected to a reference potential. In this embodiment, a case will be described in which the reference potential line 34 is connected to a grounding potential as a reference potential. Therefore, in the following description, the reference potential line 34 will be described as a grounding line 34 that is a conducting wire for grounding connected to the grounding potential. However, it is also possible to develop Embodiment 1 to an embodiment in which the reference potential line 34 is connected to, as a reference potential, a potential other than the grounding potential. An end of the charging cable 3 is connected to the power supply device 2 side, and the other end can be connected to a power receiving connector 11 provided as an in-vehicle power supply port on the vehicle 1 side. By connecting the other end of the charging cable 3 to the power receiving connector 11, the circuit configuration exemplarily shown in FIG. 1 is obtained.

The power supply lines 31 and 32 are AC lines to which AC voltage is applied. The control line 33 is a signal line through which a control signal such as a control pilot signal is transmitted and received, and charging control is performed based on a control pilot signal transmitted and received when the power supply device 2 and a charging control device 13 are connected to each other In addition, the power supply lines 31 and 32 can be also used as media for transmitting information for performing vehicle authentication, charging management, accounting management, and the like, and other various kinds of information. That is, the vehicle 1 can communicate with the power supply device 2 by superposing and separating a communication signal on and from the power supply lines 31 and 32.

The power supply device 2 includes a power supply section 20 that supplies AC power, a charging control section 21 that performs communication regarding charging control, a communication section (communication device) 22 that receives and outputs a communication signal, and a superposition/separation section 23 that superposes and separates a communication signal input to and output from the communication section 22, on and from the power supply lines 31 and 32.

One end of each of the power supply lines 31 and 32 is connected to the power supply section 20. One end of the control line 33 is connected to the charging control section 21. Lines inside the power supply device 2 are internal conducting wires that act as extended lines connected to the power supply lines 31 and 32, the control line 33, and the grounding line 34 which are contained in the charging cable 3 provided outside the power supply device 2. However, in the following description, for convenience sake, the lines inside the power supply device 2, including the extended line portions provided as the internal conducting wires, will be described as the power supply lines 31 and 32, the control line 33, and the grounding line 34.

The charging control section 21 is, for example, an output-side circuit complying with the international standard regarding charging control, and performs charging control in various states such as confirmation of connection, start of energization, and the like by transmitting and receiving a control signal such as a control pilot signal.

The communication section 22 is a communication device that performs communication by transmitting and receiving a communication signal via two signal lines 24 and 24 respectively connected to the two power supply lines 31 and 32. The communication section 22 includes a transmission circuit 220 that transmits a communication signal via the signal lines 24 and 24, and a reception circuit 221 that receives a communication signal via the signal lines 24 and 24. The superposition/separation section 23 is interposed in the two signal lines 24 and 24.

The superposition/separation section 23 is composed of a circuit such as a coupling transformer (a circuit such as an electromagnetic guidance type signal converter) and elements such as capacitors. The coupling transformer includes a first coil having both ends connected to the signal lines 24 and 24 on the power supply lines 31 and 32 side via capacitors, and a second coil electromagnetically coupled with the first coil and having both ends connected to the signal lines 24 and 24 on the communication section 22 side. Each capacitor has high impedance for the AC power supplied via the power supply lines 31 and 32, and has low impedance for a communication signal that uses a communication band for low-speed communication ranging from several 10 kHz to several 100 kHz, or a communication band for high-speed communication ranging from several MHz to several 10 MHz. That is, each capacitor, in a transmission path branched from the power supply line 31 or 32, transmits a signal in the frequency band used for the communication signal, and blocks a signal in the frequency band used for the AC power.

When the superposition/separation section 23 superposes various communication signals output from the communication section 22 on the power supply lines 31 and 32 via the signal lines 24 and 24, and inputs various communication signals separated from the power supply lines 31 and 32 into the communication section 22, power line communication using the power supply lines 31 and 32 as media is performed. That is, although the power supply device 2 includes the communication section 22 that acts as a communication device, the power supply device 2 can be regarded to act as a communication device that performs power line communication.

The vehicle 1 includes, in addition to the battery 10 and the power receiving connector 11, a charging device 12 that charges the battery 10, a charging control device 13 that performs communication regarding charging control, a communication device 14 that transmits and receives a communication signal, and a superposition/separation unit 15 that superposes and separates a communication signal on and from the two power supply lines 31 and 32.

In the vehicle 1, in-vehicle lines connected to the power supply lines 31 and 32, the control line 33, and the grounding line 34 are provided. The in-vehicle lines connected to the power supply lines 31 and 32 are AC lines connected to the charging device 12, and charging to the battery 10 is performed by the charging device 12. The in-vehicle line connected to the control line 33 is connected to the charging control device 13 via an extended line. The in-vehicle line connected to the grounding line 34 is body-earthed. In the following description, for convenience sake, the in-vehicle lines, including the AC lines and the extended lines, will be described as the power supply lines 31 and 32, the control line 33, and the grounding line 34 if it is not necessary to distinguish them.

The charging control device 13 is, for example, an input-side circuit complying with the international standard regarding charging control, and performs charging control in various states such as confirmation of connection, start of energization, and the like by transmitting and receiving a control signal such as a control pilot signal.

The communication device 14 is a device that performs communication by transmitting and receiving a communication signal via two signal lines 16 and 16 respectively connected to the two power supply lines 31 and 32. The communication device 14 includes a transmission circuit 140 that transmits a communication signal via the signal lines 16 and 16, and a reception circuit 141 that receives a communication signal via the signal lines 16 and 16. The superposition/separation unit 15 is interposed in the two signal lines 16 and 16.

The superposition/separation unit 15 is composed of a circuit such as a coupling transformer and elements such as capacitors. The coupling transformer includes a first coil having both ends connected to the signal lines 16 and 16 on the power supply lines 31 and 32 side via capacitors, and a second coil electromagnetically coupled with the first coil and having both ends connected to the signal lines 16 and 16 on the communication device 14 side. Each capacitor has high impedance for the AC power supplied via the power supply lines 31 and 32, and has low impedance for a communication signal that uses a communication band for low-speed communication ranging from several 10 kHz to several 100 kHz, or a communication band for high-speed communication ranging from several MHz to several 10 MHz. That is, each capacitor, in a transmission path branched from the power supply line 31 or 32, transmits a signal in the frequency band used for the communication signal, and blocks a signal in the frequency band used for the AC power.

When the superposition/separation unit 15 superposes various communication signals output from the communication device 14 on the power supply lines 31 and 32 via the signal lines 16 and 16, and inputs various communication signals separated from the power supply lines 31 and 32 into the communication device 14, power line communication using the power supply lines 31 and 32 as media is performed.

In the embodiment shown in FIG. 1, a loop circuit for transmitting a communication signal is formed by the superposition/separation unit 15, the signal lines 16 and 16, the power supply lines 31 and 32, the signal lines 24 and 24, the superposition/separation section 23, and other lines, elements, and circuits. Thereby, power line communication in which a communication signal is superposed on the power supply lines 31 and 32 is realized between the communication device 14 in the vehicle 1 and the communication section 22 in the power supply device 2.

Figure 2:
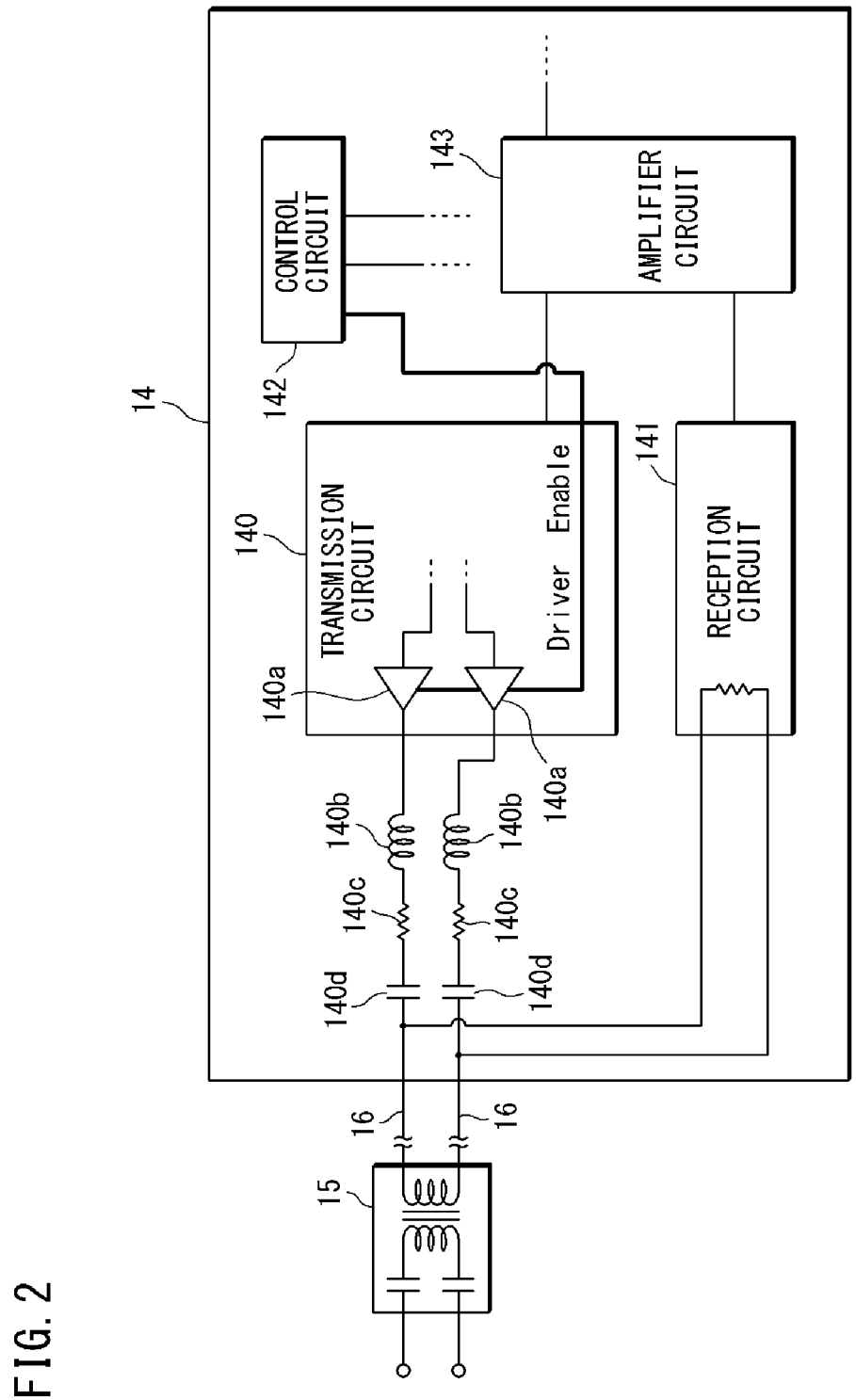
FIG. 2 is a block diagram showing an exemplary configuration of a communication device in a vehicle used in the communication system according to Embodiment 1 of the present invention.

FIG. 2 is a block diagram showing an exemplary configuration of the communication device 14 in the vehicle 1 used in the communication system according to Embodiment 1 of the present invention. As described above, the communication device 14 is connected to the two signal lines 16 and 16 respectively connected to the two power supply lines 31 and 32. The communication device 14 included in the vehicle 1 is a device that performs communication by transmitting and receiving a communication signal via the two signal lines 16 and 16 respectively connected to the two power supply lines 31 and 32. The superposition/separation unit 15 is interposed in the two signal lines 16 and 16, and the signal lines 16 and 16 connecting the superposition/separation unit 15 to the communication device 14 are used as OFDM (Orthogonal Frequency Division Multiplexing) lines. Although the signal lines 16 and 16 connected to the communication device 14 are separated into the signal lines outside the communication device 14 and the signal lines inside the communication device 14, both the external signal lines and the internal signal lines are referred to as the signal lines 16 and 16, for convenience sake.

The communication device 14 includes at least a transmission circuit 140 and a reception circuit 141, a control circuit 142 such as a microcomputer that controls the transmission circuit 140 and the reception circuit 141, and an amplifier circuit 143 such as an operational amplifier that adjusts the output voltage of a communication signal to be transmitted. In the communication device 14, the signal lines 16 and 16 are branched, and the branched signal lines 16 and 16 are respectively connected to the transmission circuit 140 and the reception circuit 141.

The transmission circuit 140 includes two line drivers 140a and 140a, and the line drivers 140a and 140a transmit a communication signal via the two signal lines 16 and 16. In addition, in the two signal lines 16 and 16 connecting the transmission circuit 140 and the superposition/separation unit 15, inductance elements 140b and 140b, resistance elements 140c and 140c, and capacitance elements 140d and 140d are interposed in series, in order from the transmission circuit 140 side. The inductance elements 140b and 140b are coils whose impedances are increased in proportion to the frequency of the communication signal. The coils as the inductance elements 140b and 140b described here each transmit a communication signal from one end thereof toward the other end thereof, and therefore, are different from the first coil and the second coil of the superposition/separation unit 15 in which a communication signal is transmitted from one of the coils to the other coil by electromagnetic induction. The resistance elements 140c and 140c are current limiting resistors having a peak current suppressing function. The capacitance elements 140d and 140d are capacitors having a DC component blocking function. An absolute value of impedance due to the inductance elements 140b and 140b and the resistance elements 140c and 140c interposed in the signal lines 16 and 16 is set to be smaller than an absolute value of impedance of a termination circuit as a destination of the communication signal, in the communication band used for the communication signal. The circuit as the destination of the communication signal described here is the reception circuit 221 of the communication section 22 included in the power supply device 2. For example, when an absolute value of impedance of the reception circuit 221 is 300Ω, the absolute value of impedance due to the inductance elements 140b and 140b and the resistance elements 140c and 140c is set to be smaller than 300Ω.

A driver enable signal (Driver Enable) from the control circuit 142 is input to the line drivers 140a and 140a. The driver enable signal to be input is a high-level signal or a low-level signal. For example, when the line drivers 140a and 140a are set to be "high-active", the line drivers 140a and 140a enter the operating state when a high-level driver enable signal is input thereto, and enter the idle state when a low-level driver enable signal is input thereto. The line drivers 140a and 140a are designed to be in the operating state only when transmitting a communication signal. Accordingly, when transmitting a communication signal, the driver enable signal to be input to the line drivers 140*a* and 140*a* is switched from a low level to a high level. Thereby, the line drivers 140*a* and 140*a* are switched from the idle state where they cannot transmit the communication signal to the operating state where they can transmit the communication signal. When the driver enable signal is switched from the high level to the low level, the line drivers 140*a* and 140*a* are switched from the operating state to the idle state.

When, with the driver enable signal being input, the line drivers 140*a* and 140*a* are switched to the state where they can transmit the communication signal, current is rapidly injected to the signal lines 16 and 16 at low impedance. At this time, harmonics may be caused by ringing. However, since the inductance elements 140*b* and 140*b* have high impedance for the harmonics, the harmonics is attenuated by the inductance elements 140*b* and 140*b*.

Accordingly, it is possible to prevent a noise component such as harmonic distortion based on occurrence of ringing from being output to the outside of the transmission circuit 140 and to the outside of the communication device 14, thereby preventing degradation of unit EMC. In particular, by making the absolute value of impedance in the communication band used for the communication signal smaller than the absolute value of impedance of the reception circuit 221 on the other end of the circuit, the communication signal itself is not greatly affected, and moreover, only the harmonic component can be effectively attenuated, and thus advantageous effects can be achieved.

Figure 3:
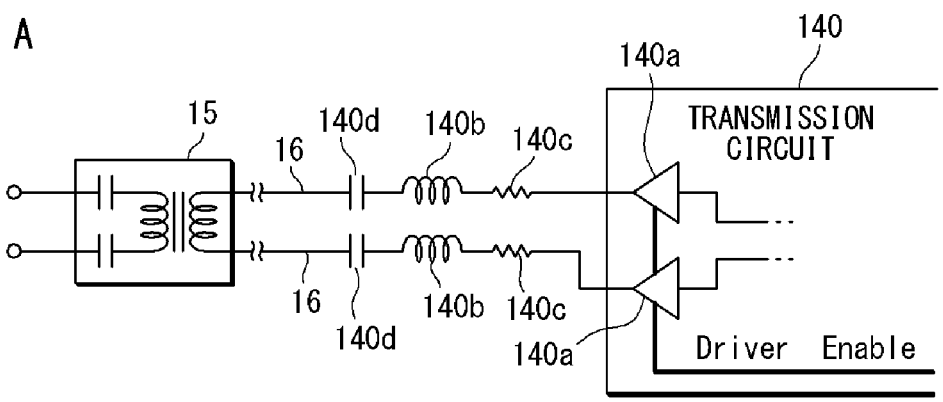
FIG. 3 is a block diagram showing an exemplary configuration of a transmission circuit in the communication device in the vehicle used in the communication system according to Embodiment 1 of the present invention.
Figure 3:
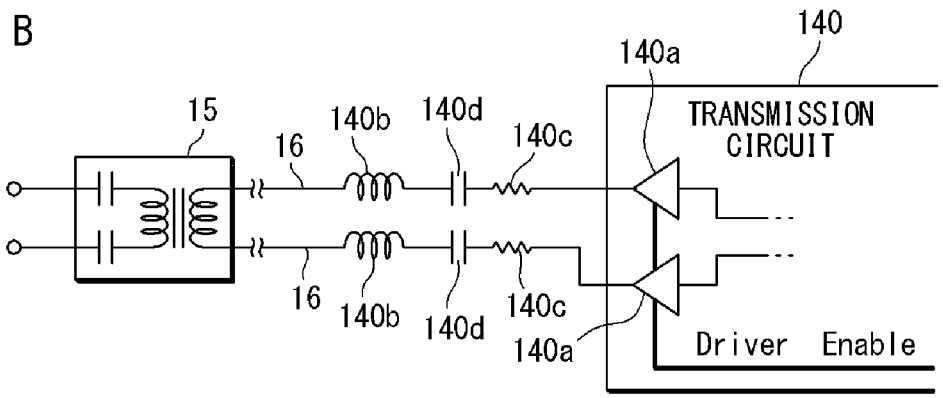

FIG. 3 shows block diagrams showing exemplary configurations of the transmission circuit 140 of the communication device 14 in the vehicle 1 used in the communication system according to Embodiment 1 of the present invention. Specifically, FIG. 3A and FIG. 3B show other exemplary configurations of the transmission circuit 140 shown in FIG. 2. FIG. 3A shows an exemplary configuration in which, in the two signal lines 16 and 16 connected to the transmission circuit 140, the resistance elements 140*c* and 140*c*, the inductance elements 140*b* and 140*b*, and the capacitance elements 140*d* and 140*d* are interposed in series in order from the line drivers 140*a* and 140*a* side. FIG. 3B shows an exemplary configuration in which, in the two signal lines 16 and 16 connected to the transmission circuit 140, the resistance elements 140*c* and 140*c*, the capacitance elements 140*d* and 140*d*, and the inductance elements 140*b* and 140*b* are interposed, in series, in order from the line drivers 140*a* and 140*a* side. Even when the configurations exemplified in FIG. 3A and FIG. 3B are adopted, the same effects as achieved by the exemplary configuration shown in FIG. 2 can be achieved.

Although FIGS. 2 and 3 show the exemplary configurations of the communication device 14 in the vehicle 1, the communication section 22 included in the power supply device 2 may have similar configurations. Therefore, as for the configuration of the communication section 22 in the power supply device 2, description thereof will be omitted on the assumption that FIGS. 2 and 3 and descriptions thereof are supposed to be referred to.

Embodiment 2

In Embodiment 2, Embodiment 1 is applied to a communication system regarding inband communication. In the following description, components identical to those of Embodiment 1 are given the same reference numerals as those in Embodiment 1, and description thereof will be omitted on the assumption that Embodiment 1 is supposed to be referred to.

Figure 4:
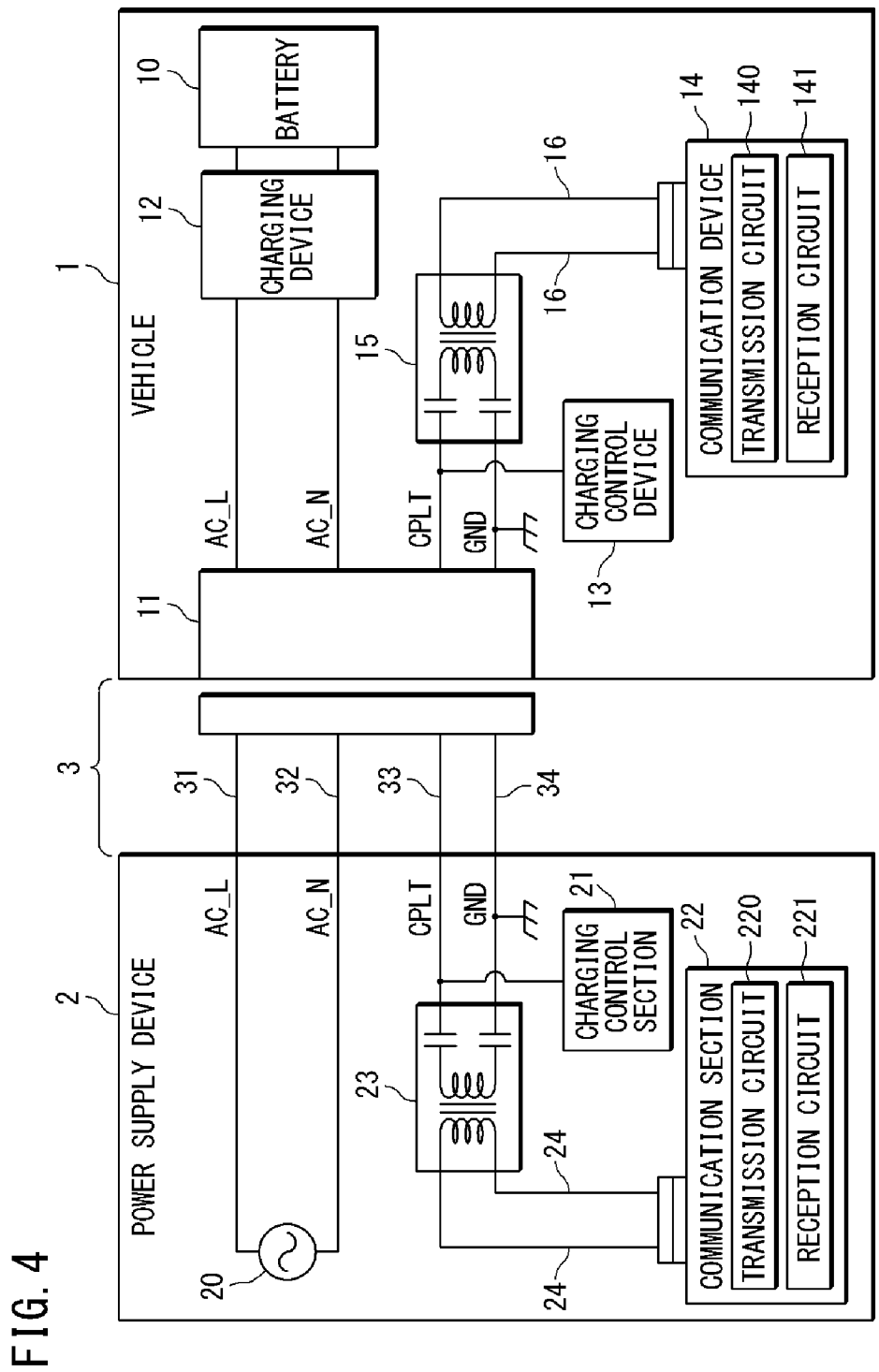
FIG. 4 is a diagram showing an exemplary configuration of a communication system according to Embodiment 2 of the present invention.
Figure 5:
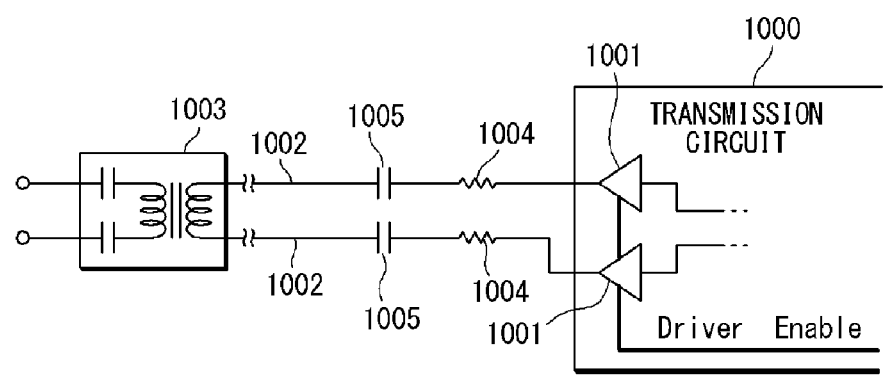
FIG. 5 is a circuit diagram showing a configuration regarding a transmission circuit included in a communication device in a conventional communication system.

FIG. 4 is a diagram showing an exemplary configuration of a communication system according to Embodiment 2 of the present invention. In Embodiment 2, the communication section 22 included in the power supply device 2 is a communication device that performs communication by transmitting and receiving a communication signal via the two signal lines 24 and 24 respectively connected to the control line 33 and the grounding line 34. The communication section 22 includes the transmission circuit 220 that transmits a communication signal via the signal lines 24 and 24, and the reception circuit 221 that receives a communication signal via the signal lines 24 and 24. The superposition/separation section 23 is interposed in the two signal lines 24 and 24.

When the superposition/separation section 23 superposes various communication signals output from the communication section 22 on the control line 33 and the grounding line 34 via the signal lines 24 and 24, and inputs various communication signals separated from the control line 33 and the grounding line 34 into the communication section 22, inband communication using the control line 33 and the grounding line 34 as media is performed. That is, although the power supply device 2 includes the communication section 22 that acts as a communication device, the power supply device 2 can be regarded to act as a communication device that performs inband communication.

The communication device 14 included in the vehicle 1 is a device that performs communication by transmitting and receiving a communication signal via the two signal lines 16 and 16 respectively connected to the control line 33 and the grounding line 34. The communication device 14 includes the transmission circuit 140 that transmits a communication signal via the signal lines 16 and 16, and the reception circuit 141 that receives a communication signal via the signal lines 16 and 16. The superposition/separation unit 15 is interposed in the two signal lines 16 and 16.

When the superposition/separation unit 15 superposes various communication signals output from the communication device 14 on the control line 33 and the grounding line 34 via the signal lines 16 and 16, and inputs various communication signals separated from the control line 33 and the grounding line 34 into the communication device 14, inband communication using the control line 33 and the grounding line 34 as media is performed.

In Embodiment 2, a loop circuit for transmitting a communication signal is formed by the superposition/separation unit 15, the signal lines 16 and 16, the control line 33, the grounding line 34, the signal lines 24 and 24, the superposition/separation section 23, and other lines, elements, and circuits. Thereby, inband communication in which a communication signal is superposed on the control line 33 and the grounding line 34 is realized between the communication device 14 in the vehicle 1 and the communication section 22 in the power supply device 2.

Since exemplary internal configurations of the communication device 14 in the vehicle 1 and the communication section 22 in the power supply device 2 according to Embodiment 2 are identical to those of Embodiment 1, detailed description thereof will be omitted on the assumption that Embodiment 1 is supposed to be referred to.

The above embodiments are merely disclosure of part of infinite number of examples of the present invention, and can be appropriately designed by adding various factors such as the purpose, usage, mode, and the like. For example, in the vehicle, the superposition/separation unit may be provided in the communication device. In addition, part or all of the inductance elements, the resistance elements, and the capacitance elements may not be provided in the communication device, but may be interposed in signal line portions arranged outside the casing of the communication device. Alternatively, the superposition/separation unit may be integrated with the power receiving connector.

Further, in the power supply device, like in the vehicle, the superposition/separation section may be provided in the communication section. In addition, part or all of the inductance elements, the resistance elements, and the capacitance elements may not be provided in the communication section, but may be interposed in signal line portions arranged outside the casing of the communication section.

Furthermore, each of the above embodiments can be developed to an embodiment in which, instead of branching the signal lines for connecting the communication device from the power supply lines or from the control line and the grounding line, the superposition/separation unit is interposed in the power supply lines or the control line, and the signal lines are connected to the power supply lines or the control line via the interposed superposition/separation unit.

REFERENCE SIGNS LIST 1 vehicle
10 battery (power storage device)
11 power receiving connector
12 charging device
13 charging control device
14 communication device
140 transmission circuit
140a line driver
140b inductance element
140c resistance element
140d capacitance element
141 reception circuit
142 control circuit
143 amplifier circuit
15 superposition/separation unit
16 signal line
2 power supply device (communication device)
20 power supply section
21 charging control section
22 communication section (communication device)
220 transmission circuit
221 reception circuit
23 superposition/separation section
24 signal line
3 charging cable
31, 32 power supply line
33 control line
34 grounding line (reference potential line)

The invention claimed is:

1. A communication device including:
a signal line connected to a power supply line used for power supply;
a transmission circuit configured to transmit a communication signal via the signal line, the transmission circuit, when transmitting the communication signal to an external reception circuit via the signal line by using the power supply line as a medium, the transmission circuit, when transmitting the communication signal, being switched from a state where it cannot transmit the communication signal to a state where it can transmit the communication signal;
an inductance element interposed in the signal line; and
a resistance element interposed in the signal line in series with the inductance element, wherein, in a communication band used for the communication signal, an absolute value of impedance caused by the inductance element and the resistance element is smaller than an absolute value of impedance of the external reception circuit.

2. A communication system in which a power supply device and a vehicle which has a communication function and includes a power storage device supplied with power from the power supply device, are connected to each other via a power supply line used for power supply, and a communication signal is transmitted and received using the power supply line as a medium, wherein
one of the power supply device and the vehicle includes:
a signal line connected to the power supply line;
a transmission circuit configured to transmit the communication signal via the signal line, the transmission circuit, when transmitting the communication signal, being switched from a state where it cannot transmit the communication signal to a state where it can transmit the communication signal; and
an inductance element interposed in the signal line, and
the other one of the power supply device and the vehicle includes a reception circuit configured to receive the communication signal transmitted from the transmission circuit, and
a resistance element interposed in the signal line(s), in series with the inductance element, wherein
in a communication band used for the communication signal, an absolute value of impedance caused by the inductance element and the resistance element is smaller than an absolute value of impedance of the reception circuit.

3. A communication device including two signal lines respectively connected to a control line for transmitting a control signal used for power supply control and to a reference potential line connected to a reference potential, and a transmission circuit configured to transmit a communication signal to an external reception circuit via the signal lines by using the power supply line as a medium, the transmission circuit, when transmitting the communication signal, being switched from a state where it cannot transmit the communication signal to a state where it can transmit the communication signal;
an inductance element interposed in the signal lines; and
a resistance element interposed in the signal line(s) in series with the inductance element, wherein, in a communication band used for the communication signal, an absolute value of impedance caused by the inductance element and the resistance element is smaller than an absolute value of impedance of the external reception circuit.

4. A communication system in which a power supply device and a vehicle which has a communication function and includes a power storage device supplied with power from the power supply device, are connected to each other via a power supply line used for power supply, a control line for transmitting a control signal used for power supply control for the power storage device, and a reference potential line connected to a reference potential, and a communication signal different from the control signal is transmitted and received using the control line and the reference potential line as media, wherein
one of the power supply device and the vehicle includes:
two signal lines respectively connected to the control line and the reference potential line;
a transmission circuit configured to transmit the communication signal via the signal lines, the transmission circuit, when transmitting the communication signal, being switched from a state where it cannot transmit the communication signal to a state where it can transmit the communication signal; and
an inductance element interposed in the signal lines, and
the other one of the power supply device and the vehicle includes a reception circuit configured to receive the communication signal transmitted from the transmission circuit, and
a resistance element interposed in the signal line(s), in series with the inductance element, wherein
in a communication band used for the communication signal, an absolute value of impedance caused by the inductance element and the resistance element is smaller than an absolute value of impedance of the reception circuit.

* * * * *